United States Patent Office 2,799,696
Patented July 16, 1957

2,799,696

MANUFACTURE OF O-(CHLOROPHENYL) PHOSPHORODICHLORIDOTHIOATES

Henry Tolkmith, Midland, and Maurice L. Zweigle, Freeland, Mich., assignors to The Dow Chemical Company, Midland, Mich., a corporation of Delaware No Drawing. Application April 4, 1956,
Serial No. 575,957

5 Claims. (Cl. 260—461)

The present invention is concerned with an improved method for the manufacture of the O-(chlorophenyl) phosphorodichloridothioates having the formula

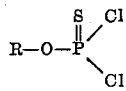

In this and succeeding formulas, R represents a chlorophenyl radical. These compounds are valuable as intermediates for the preparation of more complex phosphorus derivatives and particularly for the production of O-aryl O-alkyl phosphorochloridothioates, O-aryl O-alkyl phosphoroamidothioates and O-aryl O,O-dialkyl phosphorothioates. In such use the O-(chlorophenyl) phosphorodichloridothioate intermediate (1) is reacted with an alkali metal alcoholate to replace one chlorine atom, (2) is reacted successively with an alkali metal alcoholate and with ammonia to replace both chlorine atoms, and (3) is reacted with an alkali metal alcoholate to replace both chlorine atoms. The O-aryl O-alkyl phosphorochloridothioates, O-aryl O-alkyl phosphoroamidothioates and O-aryl O,O-dialkyl phosphorothioates are useful as preservatives for paint, paper and wood and as parasiticides for the control of bacteria, fungi, mites and insects, such as aphids, southern army worms and flies.

Several methods for preparing the O-(chlorophenyl) phosphorodichloridothioates are known. In one method the compounds may be prepared by the reaction of an O-(chlorophenyl) dichlorophosphite and phosphorus thiochloride (PSCl₃) in equimolecular proportions, whereby the sulfur of the PSCl₃ is added to the phosphorus atom of the dichlorophosphite to form an O-(chlorophenyl) phosphorodichloridothioate and phosphorus trichloride, PCl₃. This method results in yields of about 55 percent of the phosphorodichloridothioates. In another method an O-(chlorophenyl) dichlorophosphite is mixed with an equimolar amount of sulfur and heated at 220° to 230° C. at which point an exothermic reaction takes place and the reaction goes to completion rapidly. This method also results in low yields of about 60 percent of the phosphorodichloridothioates. Further, the reaction is difficult to control and produces undesirable by-products.

It is an object of the present invention to provide an improved method for the manufacture of O-(chlorophenyl) phosphorodichloridothioates. Another object is to provide a method which gives increased yields of the O-(chlorophenyl) phosphorodichloridothioates. A further object is to provide a method which gives O-(chlorophenyl) phosphorodichloridothioates in a greater yield than has previously been obtainable by known methods. Other objects will appear throughout the following specification and claims.

The new and improved process comprises reacting sulfur and an O-(chlorophenyl) dichlorophosphite having the formula

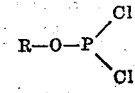

in the presence of an activated carbon catalyst. The reaction is carried out in phosphorus trichloride or phosphorus thiochloride as reaction solvents. The reaction takes place smoothly at the temperature range of from 115° to 150° C. with the production of the desired products in high yields. Upon completion of the reaction, the reaction mixture may be filtered to remove the catalyst and the filtrate fractionally distilled under reduced pressure to separate the desired product as a viscous liquid. This new process gives greater yields of the O-(chlorophenyl) phosphorodichloridothioates than have previously been obtainable by known methods.

In order to obtain the high yields of the O-(chlorophenyl) phosphorodichloridothioates, it is critical and essential that the reaction be carried out in the presence of an activated carbon with a surface area of at least 500 square meters per gram. If the surface area of the activated carbon is less than 500 square meters per gram, the yields decrease markedly. The amount of catalyst used is not critical but good results are obtained when from 0.10 to 0.50 molecular proportion of activated carbon is employed with each molecular proportion of dichlorophosphite reagent.

The reaction between the sulfur and phosphite is carried out in phosphorus trichloride or phosphorus thiochloride or a mixture thereof as reaction solvent. The employment of at least 0.1 mole of reaction solvent per mole of the O-(chlorophenyl) dichlorophosphite reagent is essential for obtaining the very desirable and high yields of the phosphorodichloridothioate products. The employment of a smaller proportion of solvent materially reduces the yields of the desired products. The solvents form mixtures with the catalyst, sulfur and phosphite reagents boiling at temperatures greater than the boiling point of the employed solvent. When employing a large quantity of phosphorus trichloride, the reaction mixture under atmospheric pressure will boil near the boiling point of the solvent under atmospheric pressure. This temperature is below the reaction temperature. Similarly, a substantial quantity of phosphorus thiochloride will give mixtures boiling at the lower end of the desired reaction temperature range. Reaction mixtures containing not more than about 0.8 mole of phosphorus trichloride or about 3 moles of phosphorus thiochloride per mole of phosphite reagent form mixtures with the reactive reagents boiling under atmospheric pressure within the reaction temperature range. When larger amounts of solvent are employed, the reaction mixture may be placed under increased or autogenous pressure and brought to and maintained in the desired temperature range. Thus, the reaction is carried out at a temperature of from 115° to 150° C. and under conditions to maintain the reaction mixture substantially in the liquid phase or state. When operating under such conditions the very excellent yields of the desired products are obtained.

Although the exact mechanics of the reaction are not understood, good results are obtained when employing substantially equimolecular proportions of sulphur and the dichlorophosphite reagent. Any unreacted sulfur is difficult to separate from the desired phosphorodichloridothioate product, and the use of an excess of sulphur is usually undesirable from the standpoint of economy. When employing phosphorus trichloride as reaction solvent, an excess of sulfur may be employed. Such excess appears in the final reaction product as phosphorus thiochloride resulting from the reaction of phosphorus trichloride and the excess sulfur.

The rate at which the reaction takes place has been found to vary directly with the temperature at which the reaction is carried out, the longer contacting periods being employed at the lower temperatures. Usually, the reaction is complete in about 6 to 18 hours.

The reaction of the present invention takes place smoothly at temperatures of from 115° to 150° C. with the formation of the desired phosphorodichloridothioates. Temperatures greater than 150° C. are not required and are undesirable from the standpoint of economy.

In carrying out the method of the present invention, the sulfur, solvent, catalyst and O-(chlorophenyl) dichlorophosphite are mixed together and maintained for a period of time under the described temperature conditions. In a convenient method of operation, the reaction is carried out at the boiling temperature and under reflux. Upon completion of the reaction, the reaction mixture is filtered to remove the catalyst and thereafter fractionated under reduced pressure to separate the desired O-(chlorophenyl) phosphorodichloridothioate.

The following examples illustrate the invention but are not to be construed as limiting.

*Example 1.*—O - (2-chlorophenyl) phosphorodichloridothioate

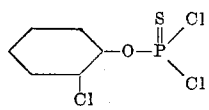

In a flask fitted with a stirrer and reflux condenser was placed 115 grams (0.5 mole) of O-(2-chlorophenyl) dichlorophosphite, 48 grams (0.35 mole) of phosphorus trichloride, 3.0 grams (0.9 mole) of sulfur and 3 grams (0.2 mole) of an activated charcoal having a surface area of 740 square meters per gram. This mixture was heated with stirring at the boiling point and under reflux for a period of nine hours. During this period the temperature of the reaction mixture gradually increased from 109° to 150° C. The reaction mixture was then filtered to remove the catalyst and the filtrate fractionally distilled under reduced pressure to obtain an O-(2-chlorophenyl) phosphorodichloridothioate product as a viscous, colorless liquid. The yield was 89 percent of theory. During the distillation the phosphorus trichloride solvent was quantitatively recovered as phosphorus thiochloride.

*Example 2.*—O-(3,4-dichlorophenyl) phosphorodichloridothioate

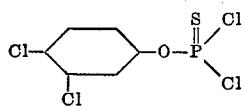

This compound was prepared from the reaction of a mixture of 133 grams (0.5 mole) of O-(3,4-dichlorophenyl) dichlorophosphite, 20 grams (0.6 mole) of sulfur, 170 grams (1.0 mole) of phosphorus thiochloride and 4 grams (0.33 mole) of an activated carbon having a surface area of 740 square meters per gram. The mixture was heated with stirring at the boiling temperature and under reflux for a period of 12 hours. During this period the temperature of the reaction mixture gradually increased from 118° to 137° C. The catalyst was then removed by filtration and the filtrate fractionally distilled under reduced pressure. As a result of these operations there was separated an 80.5 percent yield of an O-(3,4-dichlorophenyl) phosphorodichloridothioate product as a viscous, colorless liquid. During the fractionation the phosphorus thiochloride solvent was recovered quantitatively.

*Example 3.*—O - (2,4,5 - trichlorophenyl) phosphorodichloridothioate

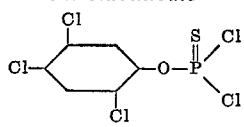

A mixture of 777 grams of O-(2,4,5-trichlorophenyl) dichlorophosphite, 650 milliliters of phosphorus thiochloride, 123 grams of sulfur and 18 grams of an activated carbon having a surface area of more than 1000 square meters per gram was heated with stirring at the boiling temperature and under reflux for a period of 20 hours. During this period the temperature of the reaction mixture gradually increased from 115° to 137° C. The catalyst was then removed by filtration and the reaction mixture fractionally distilled under reduced pressure to obtain an 87 percent yield of an O-(2,4,5-trichlorophenyl) phosphorodichloridothioate product as a viscous, colorless liquid.

In a similar manner, the method of the present invention may be employed to obtain the very desirable and improved yields of other O-(chlorophenyl) phosphorodichloridothioates as follows:

O-(4-chlorophenyl) phosphorodichloridothioate by the reaction of sulfur and O-(4-chlorophenyl) dichlorophosphite in the presence of phosphorus thiochloride and activated carbon.

O-(2,4-dichlorophenyl) phosphorodichloridothioate by the reaction of sulfur and O-(2,4-dichlorophenyl) dichlorophosphite in the presence of phosphorus trichloride and activated carbon.

O-(2,4,6-trichlorophenyl) phosphorodichloridothioate by the reaction of sulfur and O-(2,4,6-trichlorophenyl) dichlorophosphite in the presence of phosphorus trichloride and activated carbon.

O-(2,3,4,6-tetrachlorophenyl) phosphorodichloridothioate by the reaction of sulfur and O-(2,3,4,6-tetrachlorophenyl) dichlorophosphite in the presence of phosphorus thiochloride and activated carbon.

The O-(chlorophenyl) dichlorophosphites employed as starting materials in the present invention may be prepared by reacting phosphorus trichloride with a chlorophenol in the presence of magnesium chloride as catalyst. The reaction takes place smoothly at the boiling point of the reaction mixture with the evolution of hydrogen chloride of reaction. Good results are obtained when employing from three to seven moles of PCl₃ with each mole of chlorophenol. In carrying out the reaction, the phenol, catalyst and phosphorus trichloride are mixed and heated at the boiling temperature. Upon completion of the reaction as evidenced by the cessation of hydrochloride evolution, the reaction mixture is distilled under reduced pressure to separate unreacted phosphorus trichloride and obtain the desired O-(chlorophenyl) dichlorophosphite as a liquid residue.

We claim:

1. A method for the manufacture of an O-(chlorophenyl) phosphorodichloridothioate which comprises reacting at a temperature of from 115° to 150° C. one molecular proportion of an O-(chlorophenyl) dichlorophosphite with at least one molecular proportion of sulfur, the reaction being carried out in the presence of an activated carbon catalyst and a solvent, and under conditions to maintain the reaction mixture substantially in the liquid phase, the catalyst having a surface area of at least 500 square meters per gram and the solvent being at least one member of the group consisting of phosphorus trichloride and phosphorus thiochloride, said solvent being present in the amount of at least 0.1 mole per mole of the O-(chlorophenyl) dichlorophosphite reagent.

2. A method as claimed in claim 1 wherein substantially equimolecular proportions of the sulfur and O-(chlorophenyl) dichlorophosphite are employed.

3. A method as claimed in claim 2 in which the O-(chlorophenyl) dichlorophosphite is O-(2-chlorophenyl) dichlorophosphite.

4. A method as claimed in claim 2 in which the O-(chlorophenyl) dichlorophosphite is O-(3,4-dichlorophenyl) dichlorophosphite.

5. A method as claimed in claim 2 in which the O-(chlorophenyl) dichlorophosphite is O-(2,4,5-trichlorophenyl) dichlorophosphite.

No references cited.